United States Patent [19]

Van Ry

[11] Patent Number: 4,690,756

[45] Date of Patent: Sep. 1, 1987

[54] APPARATUS FOR MICROAQUACULTURE AND POLLUTION CONTROL

[76] Inventor: Charles D. Van Ry, P.O. Box 4801, Annapolis, Md. 21403

[21] Appl. No.: 734,090

[22] Filed: May 15, 1985

[51] Int. Cl.[4] .............................. B03D 1/24; C02F 1/24
[52] U.S. Cl. .................................. 210/221.2; 210/170;
210/242.2; 261/4; 261/120; 261/123; 261/DIG. 75
[58] Field of Search ............... 210/601, 602, 608, 632, 210/703-707, 747, 170, 220-221.2, 242.2, 710; 261/DIG. 75, 121, 123, 77, 4, 5, 120, 124; 209/163-167

[56] References Cited

U.S. PATENT DOCUMENTS

| | | | |
|---|---|---|---|
| 3,470,091 | 9/1969 | Budd et al. | 210/220 |
| 3,505,213 | 4/1970 | Anthony et al. | 210/170 |
| 3,669,883 | 6/1972 | Huckstedt et al. | 210/221 |
| 3,772,192 | 11/1973 | Hückstedt et al. | 210/221 |
| 3,780,471 | 12/1973 | Ort | 210/170 |
| 4,107,240 | 8/1978 | Verner et al. | 261/77 |
| 4,176,058 | 11/1979 | Grobler | 210/705 |
| 4,186,087 | 1/1980 | Kato | 210/221 |
| 4,203,837 | 5/1980 | Hoge et al. | 210/705 |
| 4,247,391 | 1/1981 | Lloyd | 210/221.2 |
| 4,267,049 | 5/1981 | Erickson et al. | 210/606 |
| 4,272,375 | 6/1981 | Pollock | 210/221.1 |
| 4,333,837 | 6/1982 | Plósz et al. | 210/170 |
| 4,338,192 | 7/1982 | Krasnoff et al. | 210/221.2 |
| 4,436,624 | 3/1984 | Kreuzburg et al. | 210/632 |
| 4,442,045 | 4/1984 | Sciolla | 210/221.2 |

FOREIGN PATENT DOCUMENTS 2398024  3/1979  France ............................. 210/242.2

OTHER PUBLICATIONS

Baylor, E. R. et al., "Dissolved Organic Matter in Seawater as a Source of Particulate Food", *Limnology and Oceanography*, 8:369-371 (1963).

Riley, Gordon A., "Organic Aggregates in Seawater and the Dynamics of their Formation and Utilization", *Limnology and Oceanography*, 8:372-381 (1963).

Batoosingh, Edward et al., "An Analysis of Experimental Methods for Producing Particulate Organic Matter in Sea Water by Bubbling", *Deep-Sea Research*, 16:213-219 (1969).

Johnson, Bruce D., "Nonliving Organic Particle Formation from Bubble Dissolution", *Limnology and Oceanography*, 21:444-446 (1976).

Johnson, Bruce D. et al., "Organic Particle and Aggregate Formation Resulting from the Dissolution of Bubbles in Seawater", *Limnology and Oceanography*, 25:653-661.

Weber, Martin E. et al., "The Mechanism of Scavenging of Waterborne Bacteria by a Raising Bubble", *Limnology and Oceanography*, 28:101-105 (1983).

*Primary Examiner*—Benoit Castel
*Attorney, Agent, or Firm*—Oblon, Fisher, Spivak, McClelland, & Maier

[57] ABSTRACT

Apparatus for producing and removing dissolved and particulate matter from natural bodies of water and wastewater in situ for the production of organic biomass such as feedstocks, for the removal of pollutants, nutrients, toxins and other substances, and for other purposes. A gas is introduced through a diffuser into a body of water to form bubbles. The bubbles rise within a lifting tube, gathering dissolved and particulate matter on their surfaces. The bubbles produce a foam at the surface of the body of water, the foam being collected in a reservoir, concentrated and drawn off.

7 Claims, 8 Drawing Figures

APPARATUS FOR MICROAQUACULTURE AND POLLUTION CONTROL

BACKGROUND OF THE INVENTION

1. Field of the Invention

The current invention relates to the farming of natural bodies of water, and in particular sea water, to obtain commercially-useful quantities of materials that may be used as feedstocks in agriculture and as raw materials in other industries. The invention also relates to removing pollutants from natural and wastewater bodies of water.

2. Description of the Prior Art

FIG. 1 represents an older model of the oceanic food web. According to this older model, sunlight-induced photosynthetic activity supports the growth of phytoplankton, which serves as a food for zooplankton. Higher-order animals such as fish (higher organic carbon: HOC) in turn feed on the zooplankton, and the food web is completed. Products secreted by plankton and produced by the decay of dead plankton contribute to the presence in the water of detritus and dissolved organic material traced as dissolved organic carbon (DOC).

In the early 1960's, it was discovered that an alternate form of productivity occurs at the foundations of the oceanic food web. In addition to the older model of FIG. 1, there is a recycled use of DOC. According to this model as illustrated in FIG. 2, waves produce turbulence and resulting bubbles. At the surfaces of the bubbles, the dissolved organic material agglomerates to form particles (referred to as particulated organic carbon, hereunder, POC). The particles of POC, consisting of proteins, carbohydrates, fats, vitamins and minerals, serve as an alternate food source in the oceanic food web. This model was suggested by Riley in 1963 (*Limnology and Oceanography*, 8: 372–381).

As illustrated in FIGS. 3 and 4, the particulation process was experimentally shown to sustain life in the laboratory as early as 1963. Baylor and Sutcliffe demonstrated that particulate foam containing POC could be produced in the laboratory by bubbling air through filtered sea water. The particulate foam thus produced could be used as a source of food for brine shrimp, which grew as shown in FIG. 4 (*Limnology and Oceanography* 8: 369–371).

SUMMARY OF THE INVENTION

According to the current invention, dissolved and particulate matter may be produced and removed from sea water in situ at any desired location without the need to transport the water to a land-based apparatus. This process includes what is hereinafter referred to as microaquaculture (MAC). The apparatus that controls and contains the MAC process is called a bioreactor.

On the microscale, natural aquatic productivity can be divided into two processes according to the driving forces: (1) sunlight induced photosynthesis, and (2) wave induced bioparticulation. In the photosynthetic process, water containing carbon dioxide and nutrients reacts with biocatalysts in phytoplankton to produce organic material. A biocatalyst is an enzyme that converts reactive molecules into new products. In the bioparticulation process, water containing DOC reacts with biocatalysts to produce POC. Thus, sun and wind drive the biological processes at the foundations of the aquatic food chain.

Collectively, microaquaculture processes consist of three formulated reactions:

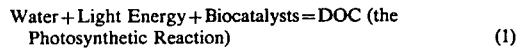
(1) Water + Light Energy + Biocatalysts = DOC (the Photosynthetic Reaction)

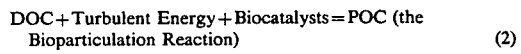
(2) DOC + Turbulent Energy + Biocatalysts = POC (the Bioparticulation Reaction)

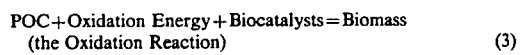
(3) POC + Oxidation Energy + Biocatalysts = Biomass (the Oxidation Reaction)

The first reaction describes the production of DOC from carbon dioxide and nutrients, such as nitrogen and phosphorous, by phytoplankton such as diatoms and dinoflagellites. Certain varieties of phytoplankton (i.e., *Skeletonema costatum*) are good, non-sacrificial, secreters, giving up as much as 35% of their photosynthetically produced carbon to the DOC pool. However, this process is daylight dependent, two-dimensional, and spatially costly. The tasks of building marine bioreactors for the photosynthetic process are formidable. Fortunately, through the ages, nature has built a huge reservoir of DOC available for harvesting.

The second reaction describes the conversion of DOC to POC by activated catalysts, which include but are not limited to enzymes. Enzymes, for example, attach to a bubbled surface which adsorbs the DOC. Certain microbes (i.e., *Serratia marcescens*) are known to secrete enzymes that greatly enhance the particulation process. The process is not light dependent and, therefore, is continuous and non-seasonal. Bioparticulation is also drought free and three dimensional with great spatial savings over competing culturing systems. Bioreactors for this process are dynamic, in that the DOC is constantly being pumped past them by wave and tidal currents. Low power requirements and low biocatalyst operating temperatures result in energy savings and fewer polluting by-products. The harvested POC is a new foodstock for upgraded organic products.

The third MAC reaction describes the conversion of POC to a wide range of organic biomass. Biomass can be grouped into three general categories: (1) energy biomass, such as foods and fuels; (2) material biomass, such as chemicals and pollutants; and (3) information biomass, such as biochips and enzymes. The genetic enhancement of these resources using conventional raw materials is already a maturing biotechnology industry. Genetic engineering converts microbe cells and biocatalysts into minifactories for the production of biomass. Bacterial varieties (i.e., *Bacillus subtilis*) are good protein secreters. Vectors, or self-replicating deoxyribonucleic acid (DNA) molecules can be used to transfer genes from other organisms to bacteria of this type. These genes direct the minifactories to produce biomass of a wide range of organic substances. MAC marine bioreactors will provide a whole new setting for a DOC/POC fed biotechnology industry.

In addition to producing organic material useful in industrial processes, MAC is useful in removing pollutants in situ from natural and wastewater bodies of water. For example, nutrients which may be removed from a body of water by MAC may have been a pollutant when dissolved in the water, contributing to the eutrophication of that body of water. MAC may also be used to remove toxic materials and other undesirable matter from natural and wastewater bodies of water.

When viewed as a means of removing pollution from a body of water, the current invention has utility not only for the direct removal of pollutants per se, but also as a means of testing for the presence of pollutants. The presence of some pollutants is very difficult to measure, because they occur in low concentrations. Accordingly, conventional testing for the presence of these pollutants involves the processing of large amounts of water, an expensive and difficult undertaking. Because the current invention produces a concentrate of the material removed from the water, any toxic materials or other pollutants removed from the water will be present in higher concentrations. Consequently, it will be easier to test for their presence in the concentrate.

Accordingly, it is an object of the current invention to provide an apparatus for removing dissolved matter from bodies of water in situ.

It is a further object of the current invention to provide an apparatus for farming bodies of water in situ to obtain organic biomass such as feedstocks and other materials useful in agriculture and industry.

It is a further object of the current invention to provide an apparatus for removing pollutants from natural and wastewater bodies of water in situ.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
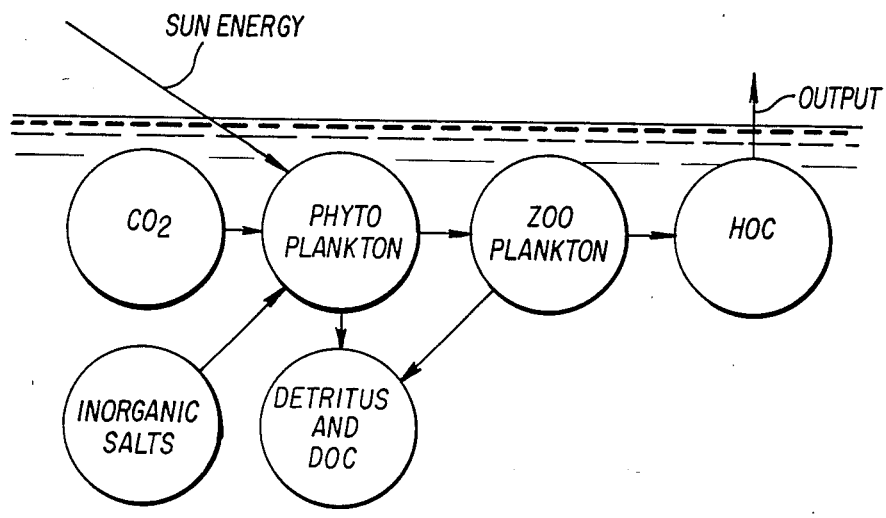
FIG. 1 is a conceptual diagram of an older oceanic food source model employing photosynthesis.
Figure 2:
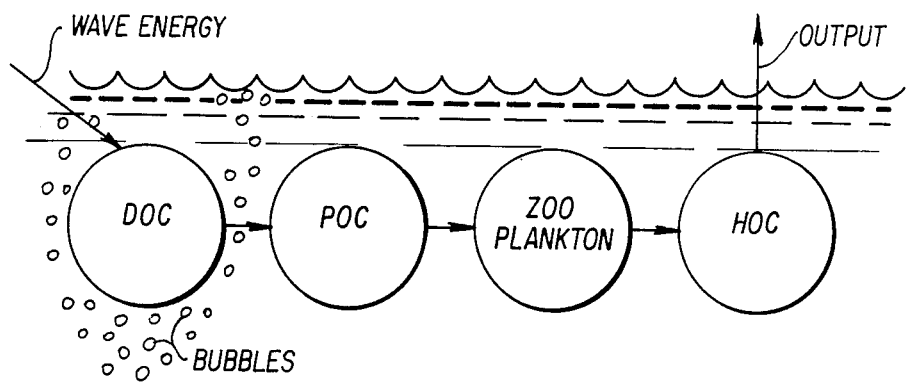
FIG. 2 is a conceptual diagram of a new oceanic food source model (supplemental to the model of FIG. 1) model as proposed by Riley.
Figure 3:
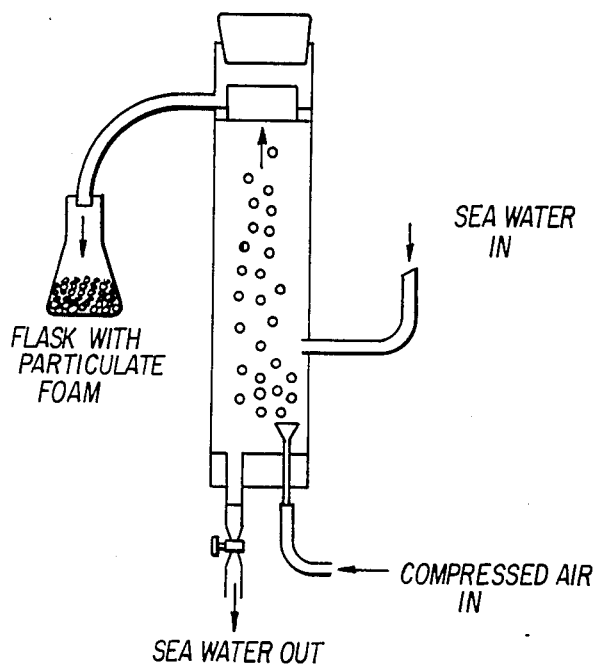
FIG. 3 is a side view of laboratory apparatus and represents an experiment performed by Baylor and Sutcliffe.
Figure 4:
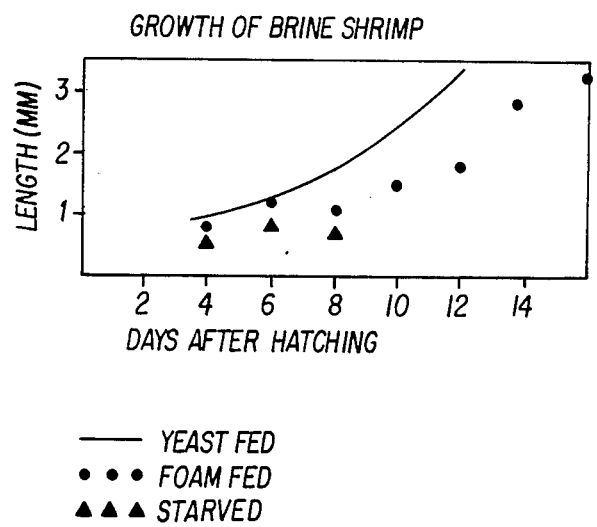
FIG. 4 illustrates the results achieved by the experiment of FIG. 3.
Figure 5:
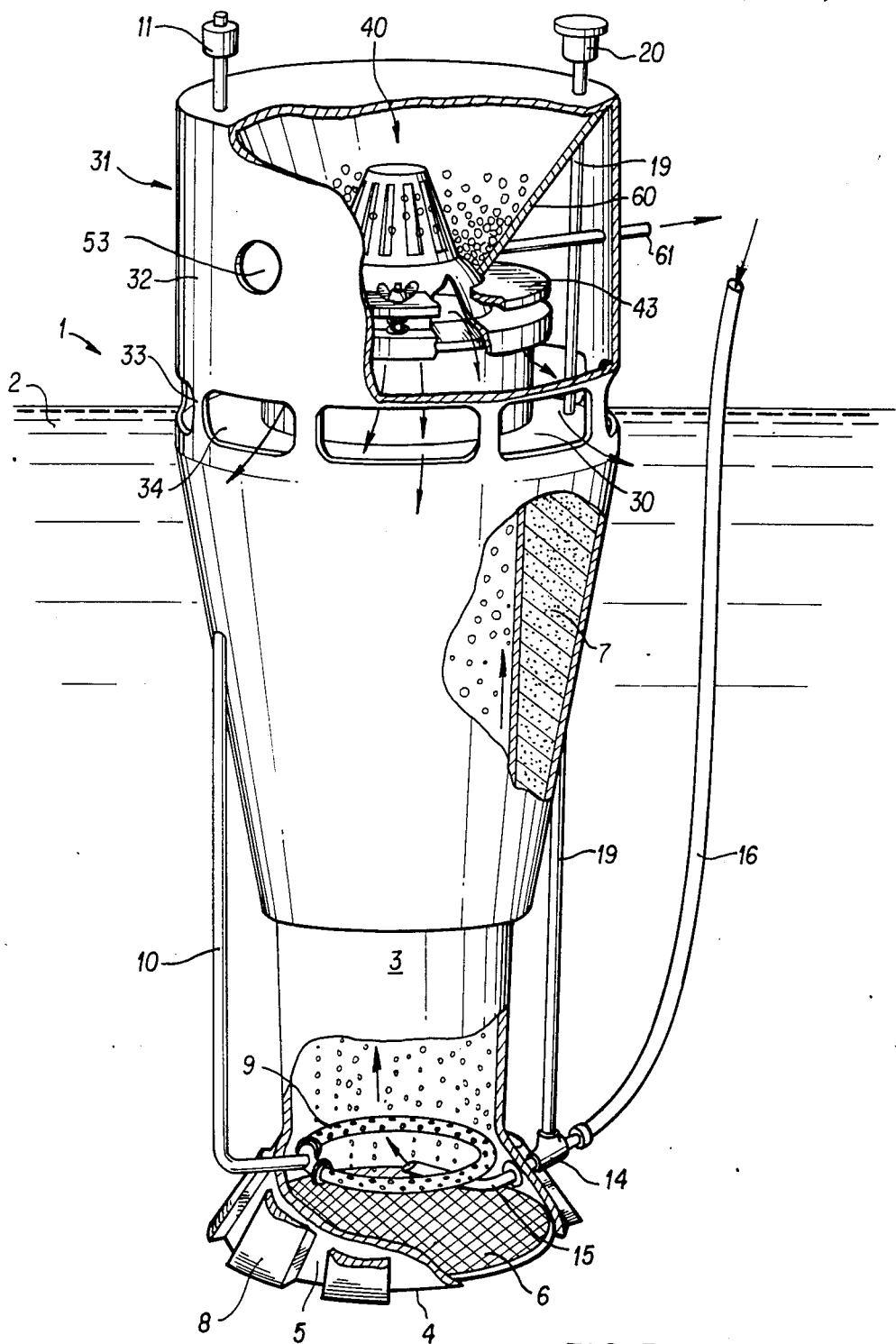
FIG. 5 is a perspective view, partly in cross-section, of a preferred form of a small-scale microaquaculture bioreactor.

Referring now to the drawings, wherein like reference numerals designate identical and corresponding parts throughout the several views, and more particularly to FIG. 5 thereof, there is shown a bioreactor 1 having therein a tube-like structure 3, which may have any appropriate cross-section. This tube-like structure, referred to hereafter simply as the lifting tube 3, is open at the top and bottom to permit the entry of sea water or the like at 4, such that the body of water 2 in which the apparatus is placed fills the lifting tube 3 up to the level of the body of water outside the tube. The open bottom of the lifting tube 3 may advantageously be flared outwardly to form an inlet nozzle 5. Protective screen 6 covers the open bottom 4 to prevent the entry of fish, seaweed and the like.

The bioreactor 1 is maintained upright in the water and floated by flotation material 7 or the equivalent thereof, such as a gas-filled tank. Flotation material 7 may advantageously be protected by a metal or fiberglass skin. Ballast weights 8 disposed on the inlet nozzle 5 help to maintain the bioreactor in upright orientation.

Figure 7:
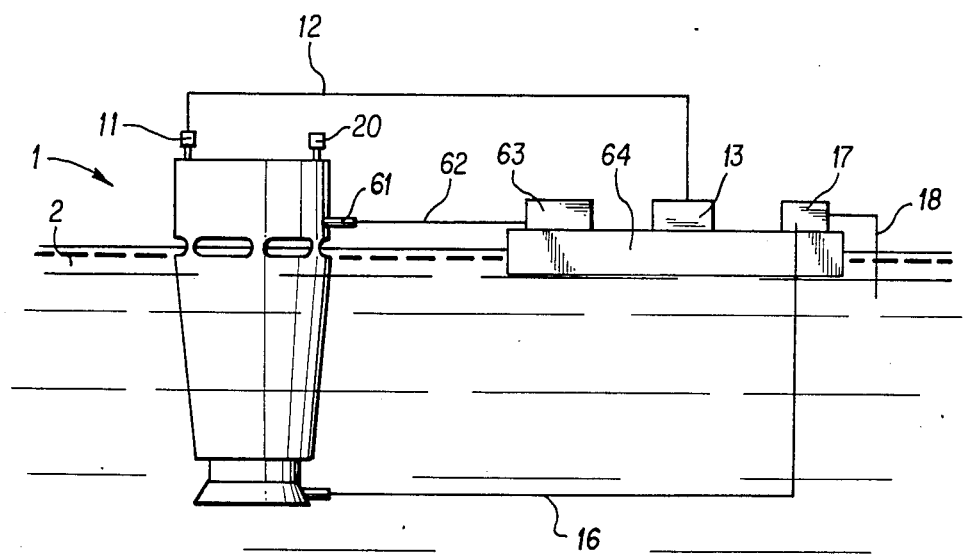
FIG. 7 illustrates schematically one possible way to use the bioreactor of FIG. 5

Disposed just inside the open bottom of lifting tube 3 is a ring or other type of diffuser 9, having a plurality of openings for the introduction of a compressed gas into the lifting tube 3. The diffuser 9 is fed compressed air through air feed pipe 10, which terminates in connector 11. As shown in FIG. 7, air pipe 10 is supplied with compressed air by air compressor 13, via air line 12 connected to connector 11.

Disposed adjacent the open bottom 4 of lifting tube 3 are injector 14 and injector outlet pipe 15, the latter being appropriately oriented so that a pressurized fluid stream leaving outlet pipe 15 will circulate in the lifting tube 3. Injector 14 is fed with water via water feed pipe 16, connected to water pump 17 (FIG. 7). Water pump 17 may draw its supply from the surrounding body of water 2 through pump inlet pipe 18.

Also connected to injector 14 is pipe 19, which terminates above the body of water in an inlet port 20. Inlet port 20 is designed so as to allow air to be drawn therein by the suction created by injector 14. Inlet port 20 also may be used as a means for introducing biocatalysts into the water stream of the bioreactor. The water pump 17 and injector mechanism may be deleted in certain modes of operation.

Disposed on the exterior of lifting tube 3, near the open top thereof, is annular surface 30. This surface extends radially outwardly to the outer edge of the apparatus.

Cover 31 has a closed top and a cylindrical sidewall 32, which extends downwardly toward annular surface 30 but is spaced therefrom by cover supports 33. The result is the formation of a plurality of seawater return openings 34, through which seawater within cover 34 may be returned to the body of water.

Figure 6:
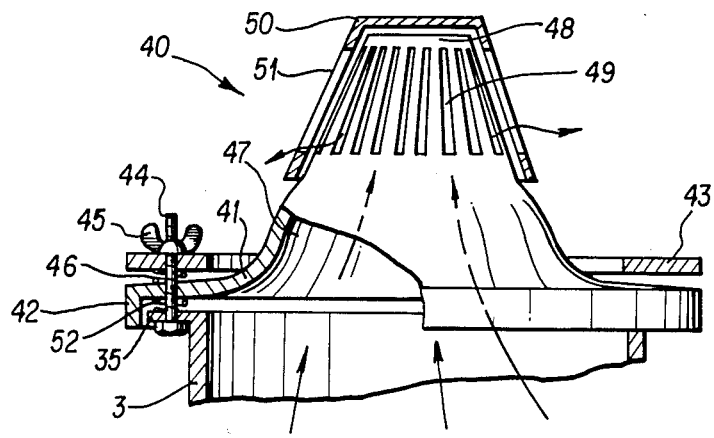
FIG. 6 is an elevation, partly in cross-section, of the baffle assembly of the bioreactor of FIG. 5 attached to the top of the lifting tube.

Disposed within the cover 31 is baffle assembly 40, shown in more detail in FIG. 6. Lifting tube 3 terminates in an outwardly extending flange 35, on which rests baffle 41. Baffle 41 flares radially outwardly, preferably is flexible, and may advantageously terminate in a downwardly extending flange 42.

Annular collar 43 sandwiches the radially outermost portion of baffle 41 between collar 43 and flange 35. A plurality of bolts 44 extend through the collar 43, through the baffle 41 and through the flange 35. Compression spring 46 biases the baffle 41 toward the flange 35. An additional compression spring 52 may be used to separate baffle 41 from flange 35. The assembly is held together and mounted to the lifting tube by bolts 44 and wing nuts 45. As illustrated in FIG. 5, the cylindrical side wall 32 of cover 31 may advantageously be provided with a plurality of access holes 53, through which the wing nuts 45 may be adjusted to alter the compression of springs 46 and 52.

Baffle 41 is substantially hollow, thereby forming foam collection chamber 47 therein. Baffle 41 terminates in an upwardly-extending chimney 48, having a plurality of slits 49 therein. Chimney 48 is covered by rotatable cap 50, in which there are a corresponding number of slits 51. By turning cap 50 with respect to chimney 48, the effective cross-sectional area of the passages formed by slits 49 and 51 may be varied, thereby altering the degree of communication between the foam collection chamber 47 and the foam reservoir and condenser 60 (FIG. 5). Outlet 61 is in communication with the interior of the foam reservoir and condenser 60. As illustrated in FIG. 7, outlet 61 may be in communication with a vacuum source 63 via outlet pipe 62.

Vacuum source 63, air compressor 13 and water pump 17 may be located on a floating platform 64 or may be located on the bioreactor itself. When the bioreactor is used near land, these devices may be located on the shore or on a pier.

The operation of the embodiment of FIGS. 5-7 will now be described. Compressed air from pipe 10 and ring diffuser 9 creates bubbles adjacent the surface of the diffuser. The rising bubbles, which are formatively enhanced by the force of the fluid stream from injector outlet pipe 15, create an upward flow within lifting tube 3, thereby drawing environmental water by airlift pump action into the lifting tube through its open bottom 4.

If desired, catalysts for enhancing the bioparticulation process may be added to the ejector stream through inlet port 20.

As the bubbles rise within the lifting tube, they adsorb dissolved material on their surfaces. It is advantageous to maximize the amount of bubble surface available for collection of dissolved material. The bubbles expand as they rise, and the available surface area of the bubbles may be increased by increasing the number of bubbles. Accordingly, the bubbles as formed at the diffuser 9 should initially be as small as possible. The bubble size is a function of the size of the pores of the diffuser and the pressure difference across the pores. Accordingly, these two parameters may be adjusted to optimize the operation of the bioreactor.

Upon reaching the surface of the water, the rising bubbles generate foam at the surface thereof, which pushes into foam collection chamber 47.

Water reaching the top of the tube 3 builds in collection chamber 47, creating a head of water against the lower interior surface of the baffle 41, thereby lifting it against the adjusted forces of springs 46 and 52. Water then spills over flange 35 and returns to the environmental body of water through return openings 34.

As foam continues to collect in collection chamber 47, it is pushed upwardly into chimney 48, from which it exits through adjustable slits 49 and 51 into reservoir and condenser 60. There, the foam condenses to form an aqueous concentrate of DOC and POC and is drawn off as a liquid through outlet 61. If desired, vacuum source 63 and outlet pipe 62 may be omitted, allowing the concentrate to drain from outlet 61 into a container.

Accordingly, the baffle assembly serves as a means for separating the foam from the rising water at the top of tube 3. The baffle helps to knock down the rising water. The slits 49, 51 not only serve to separate the foam from the rising water but also initiate or aid in the break-down of the foam. The variability of the size of the slits allows the user to regulate these functions.

Table 1, below, sets forth the results of laboratory testing that was conducted to determine the amount of protein present in three separate samples of POC concentrate that were collected using a prototype bioreactor substantially like the one illustrated in FIG. 5.

TABLE I

| Sample No. | % Protein (wet weight basis) | no. of Runs |
| --- | --- | --- |
| 1 | 3.13 | 2 |

TABLE I-continued

| Sample No. | % Protein (wet weight basis) | no. of Runs |
| --- | --- | --- |
| 2 | 3.10 | 2 |
| 3 | 2.05 | 1 |

Samples number 1 and 2 were collected in Round Bay, Severn River, Md. Sample number 3 was collected at the Duke University Marine Laboratory in Beaufort Sound near Morehead City, NC.

The protein determination was made using the macro-Kjeldahl method. The percent protein reported in Table I represents the arithmetic mean of the number of runs for a particular sample, also as listed in Table I. The conventional procedure with the macro-Kjeldahl method is to report the arithmatic mean of three runs; insufficient material was available for three runs in this case.

The significance of the percent protein reported in Table I may be understood by comparison with the knowledge that the protein content of ordinary fish flesh is 8–10% (wet weight basis). From this comparison, the potential for using POC as an organic biomass is clearly very favorable.

Photos from the Duke University Marine Laboratory of an electron microscope scan of material experimentally obtained by the inventor from MAC bioreactor bubbles from Round Bay and Beaufort Sound reveal an amorphous material intergrouped with shell type structures, presumed to be of a protozoean or phytoplankton origin. From this information and a survey of prior laboratory analyses of DOC and POC, it is predicted that the primary components are dissolved saccharides, emulsed lipids, denatured proteins, and cellular wall material such as shells and cellulose. All of these components have resource potential from a nutrition standpoint or for the detection and prevention functions of pollution control. The survey of laboratory analyses of DOC and POC suggested adsorption on bubbles concentration factors in the range of 100 to 10,000 times. Visual analyses of the samples from Round Bay and Beaufort Sound resulted in estimates of DOC and POC concentrations of approximately 1000 times in the MAC bioreactor output over the concentrations in the surrounding waters. Concentrating abilities of this order of magnitude resulting from the flow rates and efficiencies embodied in the described apparatus provide the commercial basis for microaquaculture and pollution control.

Figure 8:
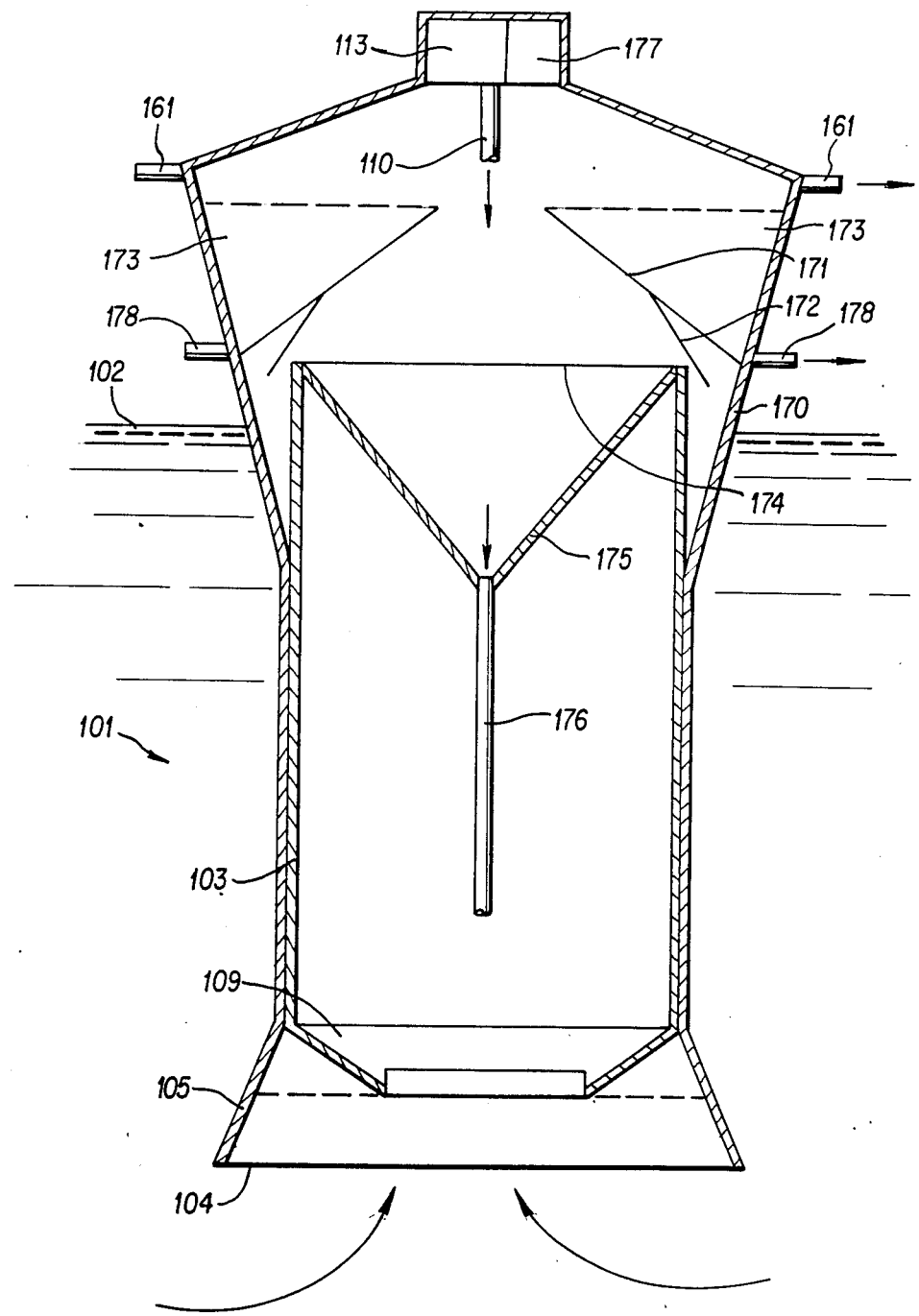
FIG. 8 is a vertical cross-section of a large-scale bioreactor.

Referring now to FIG. 8, there is illustrated a large-scale bioreactor 101. Lifting tube 103 terminates at its lower end in inlet nozzle 105 having an open bottom 104. Diffusers 109 are fed with compressed air through feed pipe 110, which in turn is connected to air compressor 113 atop the apparatus.

Foam reaching the top of lifting tube 103 enters foam fractionator 170, which covers the top of lifting tube 103. Disposed within foam fractionator 170 is a conic wall or walls 171 from which depend a plurality of flapper valves 172 used to separate foam from returning seawater. Returning seawater pours over the lip of spillover 174, down wall 175 and thence into seawater return passage 176.

Disposed above conic wall 171 is a foam refiner 173. The crude POC may be refined into various products in state-of-the-art refiners 173, the refined products being drawn off through outlets 178. Crude POC may also be drawn off through outlet 161, without being refined. Instrumentation package 177 is used to control the various functions of the bioreactor.

It is contemplated that all embodiments of the apparatus will be transportable to any desired site, and that more than one such apparatus may be used for large-scale removal of dissolved and particulate matter from bodies of water. In order to position the collection chamber proximate the surface of the body of water, and depending upon the depth of the body of water, the apparatus may be provided with legs to rest on the bed of the body of water in lieu of floatation apparatus.

It is further contemplated that the method may be carried out on a large or small scale, depending upon the intended use. For example, in farming the ocean to produce commercial quantities of biostock, one or more large-scale bioreactors may be used. It is contemplated that a lifting tube for such an apparatus might have a diameter of 5 m and a height of 15 m. On the other end of the scale, when obtaining a sample concentration of water pollutants to determine the presence of toxins, a small device having a diameter of 1 m or less and a height of 1 or 2 m might be preferable. In theory, it is possible to practice the method according to the invention on a small scale even without the use of a lifting tube for confining the rising bubbles. In still water, a diffuser for injecting air into the body of water, a collector for concentrating foam and a suction hose for drawing off the foam and accompanying particulates could be used. In theory, fully submersed modes of operation also are possible.

The method also contemplates that the process may be enhanced by the addition of a catalyst functioning as described above for enhancing the formation of particulate solids on the surfaces of the bubbles and for enhancing the formation of the ensuing foam.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. Apparatus for removing dissolved matter from a body of water in situ comprising:

a substantially hollow tube having a substantially open top and bottom, and a screen covering said open bottom;

means for supporting said tube vertically in a body of water such that the top is disposed proximate the surface;

a source of compressed air;

air releasing means connected to the source of compressed air and disposed proximate the open bottom of the tube so that air released from the air releasing means will formula bubbles that rise within the tube and draw in water through the open bottom of the tube;

a baffle liftably supported on the top of the tube so that water, upwelling in the tube may lift the baffle and overflow the top of the tube, the baffle having an upper portion with at least one opening therein and being shaped to direct foam provided by the bubbles to the at least one opening;

reservoir means disposed around the baffle or receiving foam passing through the at least one opening in the baffle; and outlet means in communication with said reservoir means for removing said foam from said reservoir means.

2. The apparatus of claim 1, wherein said baffle comprises collecting means disposed proximate said hollow tube and in communication therewith for collecting foam produced by said bubbles.

3. The apparatus of claim 2, wherein said collecting means further comprises a collection chamber in communication with said tube.

4. The apparatus of claim 3, wherein said collection chamber further comprises an extension of the top of said tube.

5. The apparatus of claim 1, wherein said baffle comprises means for varying the effective cross-sectional area of said at least one opening.

6. The apparatus of claim 1, further comprising injector means adjacent said substantially open bottom of said hollow tube for injecting a circulating stream of water within said tube.

7. The apparatus of claim 1, further comprising flotation means for supporting said hollow tube proximate the surface of the body of water.

* * * * *